(12) United States Patent
Yoon et al.

(10) Patent No.: US 7,794,875 B2
(45) Date of Patent: *Sep. 14, 2010

(54) BATTERY MODULE

(75) Inventors: Junill Yoon, Seoul (KR); Seungjae You, Daejeon (KR); Heekook Yang, Daejeon (KR); Jongmoon Yoon, Daejeon (KR); Jisang Yu, Daejeon (KR); John E. Namgoong, Daejeon (KR)

(73) Assignee: LG Chem, Ltd. (KR)

( * ) Notice: Subject to any disclaimer, the term of this patent is extended or adjusted under 35 U.S.C. 154(b) by 951 days.

This patent is subject to a terminal disclaimer.

(21) Appl. No.: 11/567,334

(22) Filed: Dec. 6, 2006

(65) Prior Publication Data

US 2007/0184341 A1    Aug. 9, 2007

(30) Foreign Application Priority Data

Feb. 9, 2006   (KR) .................... 10-2006-0012303

(51) Int. Cl.
```
H01M 2/02      (2006.01)
H01M 2/04      (2006.01)
H01M 2/08      (2006.01)
H01M 6/42      (2006.01)
H01M 6/46      (2006.01)
```
(52) U.S. Cl. .................. 429/177; 429/152; 429/159; 429/185

(58) Field of Classification Search ............. 429/159, 429/185, 152, 162, 94, 241, 158, 176, 231.8, 429/100, 160; 136/166; 320/112; 29/623.1
See application file for complete search history.

(56) References Cited

U.S. PATENT DOCUMENTS 2,191,313 A * 2/1940 Carlisle ............... 429/241

(Continued)

FOREIGN PATENT DOCUMENTS

JP        61171065 A * 8/1986

(Continued)

OTHER PUBLICATIONS

Abstract of JP 61171065, Aug. 1986, Komada et al.*

(Continued)

*Primary Examiner*—Jonathan Crepeau
*Assistant Examiner*—Kenneth Douyette
(74) *Attorney, Agent, or Firm*—Cantor Colburn LLP (57) ABSTRACT

Disclosed herein is a battery module including two battery cells, each of which has electrode terminals formed at upper and lower ends thereof. The battery module further includes a frame member, to which upper-end sealing parts, lower-end sealing parts, and one-side sealing parts of the battery cells are mounted, a metal sheathing member for covering the outer surfaces of the battery cells while the battery cells are mounted to the frame member, and caps (an upper-end cap and a lower-end cap) mounted to the upper and lower ends of the battery cells, respectively, which are covered by the metal sheathing member. According to the present invention, it is possible to minimize the weight and the size of the battery module while increasing the strength of the battery cells. Also, it is possible to easily mount the detecting means that detects the operation of the battery cells, and it is possible to effectively prevent the occurrence of short circuits during the assembly or the operation of the battery module. Furthermore, it is possible to easily perform the electric connection between the battery modules when manufacturing the medium- or large-sized battery module using the respective battery modules as unit bodies.

12 Claims, 4 Drawing Sheets

U.S. PATENT DOCUMENTS

| | | | |
|---|---|---|---|
| 2,840,624 A * | 6/1958 | Folke et al. | 429/158 |
| 3,859,133 A * | 1/1975 | Dickfeldt et al. | 429/176 |
| 6,225,778 B1 * | 5/2001 | Hayama et al. | 320/112 |
| 6,344,296 B1 * | 2/2002 | Ishii et al. | 429/231.8 |
| 6,451,474 B1 * | 9/2002 | Kozu et al. | 429/100 |
| 6,455,190 B1 * | 9/2002 | Inoue et al. | 429/160 |
| 6,558,438 B1 * | 5/2003 | Satoh et al. | 29/623.1 |
| 2001/0036571 A1 * | 11/2001 | Oogami et al. | 429/94 |
| 2005/0089751 A1 * | 4/2005 | Oogami et al. | 429/162 |

FOREIGN PATENT DOCUMENTS

| | | | |
|---|---|---|---|
| JP | 09171802 A * | 6/1997 | |
| KR | 1020060047061 | 5/2006 | |
| WO | 2005/074054 | 8/2005 | |

OTHER PUBLICATIONS

Machine Translation of JP 09171802, Jun. 1997, Matsuo et al.*

* cited by examiner

FIG. 1

Prior Art

BATTERY MODULE

FIELD OF THE INVENTION

The present invention relates to a battery module, and, more particularly, to a battery module including two battery cells, each of which has electrode terminals formed at upper and lower ends thereof, wherein the battery module further includes a frame member, to which upper-end sealing parts, lower-end sealing parts, and one-side sealing parts of the battery cells are mounted, a metal sheathing member for covering the outer surfaces of the battery cells while the battery cells are mounted to the frame member, and caps (an upper-end cap and a lower-end cap) mounted to the upper and lower ends of the battery cells, respectively, which are covered by the metal sheathing member.

BACKGROUND OF THE INVENTION

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Small-sized mobile devices use one or several small-sized cells for each device. On the other hand, medium- or large-sized devices, such as vehicles, use a medium- or large-sized battery module having a plurality of battery cells electrically connected with each other because high output and large capacity are necessary for the medium- or large-sized devices.

Preferably, the medium- or large-sized battery module is manufactured with small size and small weight if possible. For this reason, a prismatic battery or a pouch-shaped battery, which can be stacked with high integration and has a small weight to capacity ratio, is usually used as a battery cell of the medium- or large-sized battery module. Especially, much interest is currently generated in the pouch-shaped battery, which uses an aluminum laminate sheet as a sheathing member, because the pouch-shaped battery is lightweight and can be manufactured with low costs.

Figure 1:
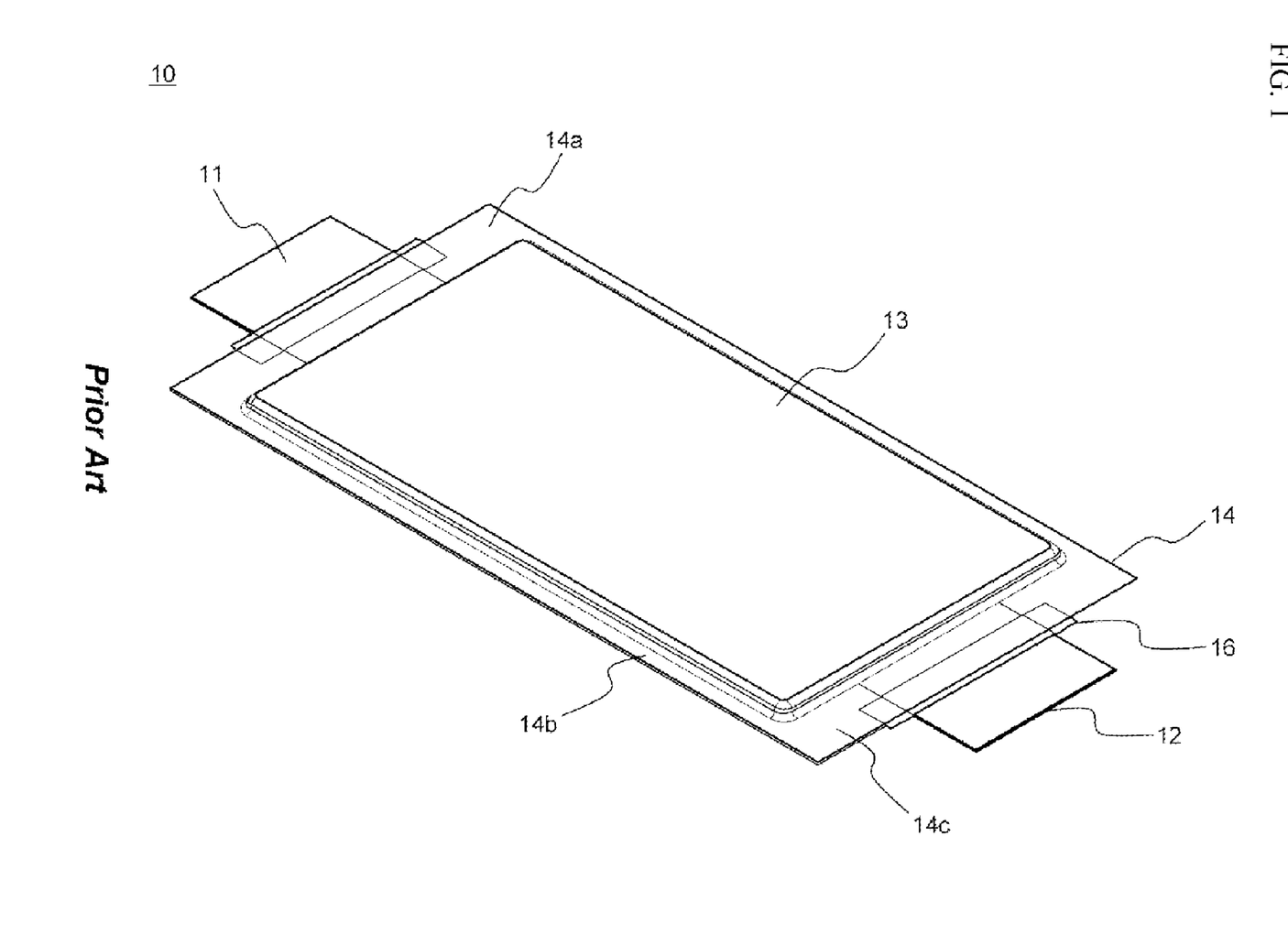
FIG. 1 is a perspective view illustrating a conventional representative pouch-shaped battery.

FIG. 1 is a perspective view typically illustrating a conventional representative pouch-shaped battery. The pouch-shaped battery 10 shown in FIG. 1 is constructed in a structure in which two electrode leads 11 and 12 protrude from the upper end and the lower end of a battery body 13, respectively, while the electrode leads 11 and 12 are opposite to each other. A sheathing member 14 comprises upper and lower sheathing parts. That is, the sheathing member 14 is a two-unit member. An electrode assembly (not shown) is received in a receiving part, which is defined between the upper and lower sheathing parts of the sheathing member 14. Opposite sides 14a and upper and lower ends 14b and 14c, which are contact regions of the upper and lower sheathing parts of the sheathing member 14, are bonded to each other, whereby the pouch-shaped battery 10 is manufactured. The sheathing member 14 is constructed in a laminate structure of a resin layer/a metal film layer/a resin layer. Consequently, it is possible to bond the opposite sides 14a and upper and lower ends 14b and 14c of the upper and lower sheathing parts of the sheathing member 14, which are in contact with each other, to each other by applying heat and pressure to the opposite sides 14a and upper and lower ends 14b and 14c of the upper and lower sheathing parts of the sheathing member 14 so as to weld the resin layers to each other. According to circumstances, the opposite sides 14a and upper and lower ends 14b and 14c of the upper and lower sheathing parts of the sheathing member 14 may be bonded to each other using a bonding agent. For the opposite sides 14a of the sheathing member 14, the same resin layers of the upper and lower sheathing parts of the sheathing member 14 are in direct contact with each other, whereby uniform sealing at the opposite sides 14a of the sheathing member 14 is accomplished by welding. For the upper and lower ends 14b and 14c of the sheathing member 14, on the other hand, the electrode leads 11 and 12 protrude from the upper and lower ends 14b and 14c of the sheathing member 14. For this reason, the upper and lower ends 14b and 14c of the upper and lower sheathing parts of the sheathing member 14 are thermally welded to each other, while a film-shaped sealing member 16 is interposed between the electrode leads 11 and 12 and the sheathing member 14, in consideration of the thickness of the electrode leads 11 and 12 and the difference in material between the electrode leads 11 and 12 and the sheathing member 14, so as to increase sealability.

However, the mechanical strength of the sheathing member 14 is low. In order to solve this problem, there has been proposed a method of mounting battery cells (unit cells) in a pack case, such as a cartridge, so as to manufacture a battery module having a stable structure. Also, a device or a vehicle, in which a medium- or large-sized battery module is installed, has a limited installation space. Consequently, when the size of the battery module is increased due to the use of the pack case, such as the cartridge, the spatial utilization is lowered. Due to the above-mentioned low mechanical strength, the battery cells repeatedly expand and contract during the charge and the discharge of the battery cells. As a result, the thermally welded regions may be easily separated from each other.

Since the battery module is a structure including a plurality of unit cells, which are combined, the safety and the operating efficiency of the battery module are lowered when overvoltage, overcurrent, and overheat occurs in some of the unit cells. Consequently, means for detecting the overvoltage, the overcurrent, and the overheat are needed. Specifically, voltage and temperature sensors are connected to the battery cells so as to detect and control the operation of the battery cells in real time or at predetermined time intervals. However, the attachment or the connection of the detecting means complicates the assembly process of the battery module. In addition, short circuits may occur due to the provision of a plurality of wires.

SUMMARY OF THE INVENTION

Therefore, the present invention has been made to solve the above problems, and other technical problems that have yet to be resolved.

Specifically, it is an object of the present invention to provide a battery module wherein the weight and the size of the battery module are minimized while the strength of battery cells is increased, detecting means that detects the operation of the battery cells is easily mounted, and the occurrence of short circuits is effectively prevented during the assembly or the operation of the battery module.

It is another object of the present invention to provide a battery module wherein the electric connection between battery modules is easily accomplished when a medium- or large-sized battery module is manufactured using each battery module as a unit body.

In accordance with one aspect of the present invention, the above and other objects can be accomplished by the provision of a battery module comprising two battery cells, each of which has electrode terminals formed at upper and lower ends thereof, wherein the battery module further comprises: a frame member, to which upper-end sealing parts, lower-end sealing parts, and one-side sealing parts of the battery cells are mounted; a metal sheathing member for covering the outer surfaces of the battery cells while the battery cells are mounted to the frame member; and caps (an upper-end cap and a lower-end cap) mounted to the upper and lower ends of the battery cells, respectively, which are covered by the metal sheathing member.

Each battery cell is a secondary battery having an electrode assembly, which can be charged and discharged, mounted therein and a sealing part formed at the edge thereof by thermal welding. Preferably, the secondary battery is constructed in a structure in which the electrode assembly is mounted in a battery case made of a laminate sheet including a metal layer and a resin layer, for example, a pouch-shaped case made of an aluminum laminate sheet. Hereinafter, the secondary battery with the above-stated construction will be referred to as a pouch-shaped battery cell.

The case of the pouch-shaped battery may be constructed in various structures. For example, the sheathing member of the pouch-shaped battery may be constructed in a structure in which the electrode assembly is received in a receiving part formed at the upper inner surface and/or the lower inner surface of a two-unit member, and the upper and lower contact regions are sealed. A pouch-shaped battery cell with the above-described construction is disclosed in PCT International Application No. PCT/KR2004/003312, which has been filed in the name of the applicant of the present patent application. The disclosure of the above-mentioned patent application is hereby incorporated by reference as if fully set forth herein.

The electrode assembly comprises cathodes and anodes, by which the charge and the discharge of the battery are possible. The electrode assembly is constructed in a structure in which the cathodes and the anodes are stacked while separators are disposed between the respective cathodes and the respective anodes. For example, the electrode assembly is constructed in a jelly-roll type structure or in a stacking type structure. The cathodes and the anodes of the electrode assembly may be constructed such that electrode taps of the cathodes and electrode taps of the anodes directly protrude outward from the battery. Alternatively, the cathodes and the anodes of the electrode assembly may be constructed such that the electrode taps of the cathodes and the electrode taps of the anodes are connected to additional leads, and the leads protrude outward from the battery.

In a preferred embodiment, the frame member includes a lower-end frame having a groove, into which the lower electrode terminals of the battery cells are inserted while the lower electrode terminals of the battery cells are coupled with each other, the lower-end frame being constructed such that the lower-end sealing parts of the battery cells are mounted to the lower-end frame, an upper-end frame constructed such that the upper-end sealing parts of the battery cells are mounted to the upper-end frame, and a side frame connected between the lower-end frame and the upper-end frame, the side frame being constructed such that the one-side sealing parts of the battery cells are mounted to the side frame.

Specifically, the frame member is constructed in a structure in which the upper-end frame and the lower-end frame are connected to each other via the side frame. That is, the frame member is constructed generally in a "⊏"-shaped structure.

In this structure, the upper-end frame or the lower-end frame may be provided with a terminal (detection terminal) for detecting the voltage and/or the temperature of the battery cells, and the upper-end frame may be provided with connection terminals for connecting the detection terminal to an external circuit. Consequently, when the battery cells are mounted to the frame member, the battery cells are automatically connected to the detecting means for detecting the voltage and/or the temperature of the battery cells, and therefore, a process for manufacturing the battery module is further simplified.

Especially, in a structure in which the detection terminal is mounted at the lower-end frame, and the detection terminal is connected to the connection terminals of the upper-end frame via a wire mounted in the side frame, the wire for connecting the detection terminal is not exposed to the outside. Consequently, the occurrence of short circuits is prevented during the assembly and the use of the battery module. The connection terminals may be constructed in a protruding structure or in a depressed structure.

In the frame member according to the present invention, the lower-end frame is a region where the lower-end sealing parts of the battery cells are mounted. The lower electrode terminals of the battery cells are inserted into the groove of the lower-end frame while the lower electrode terminals of the battery cells are coupled with each other. The lower electrode terminals of the battery cells may be inserted into the groove of the lower-end frame while the lower electrode terminals of the battery cells are coupled with each other, for example, by welding. The groove of the lower-end frame may have a size corresponding to that of the coupled electrode terminals. Alternatively, the lower-end frame may be constructed in a structure in which the lower-end frame is open at the side opposite to the side frame.

In the case that the voltage and/or temperature detection terminal is mounted at the lower-end frame, it is preferable that the lower-end frame have a through-hole, to which the detection terminal is connected. Consequently, the electrode terminals may be connected to the detection terminal through the through-hole while the coupled electrode terminals are inserted in the groove. Alternatively, corresponding regions of the electrode terminals are drilled through the through-hole while the coupled electrode terminals are inserted in the groove, and an additional conductive fixing member may be inserted through the through-hole such that the electrode terminals can be connected to the detection terminal.

The side frame serves to interconnect the lower-end frame and the upper-end frame. The side frame is a region where the one-side sealing parts of the battery cells are mounted. Consequently, when the battery cells are mounted to the frame member, the other-side sealing parts of the battery cells are exposed while the other-side sealing parts are not supported by the side frame.

Preferably, the side frame may be provided with grooves, into which the one-side sealing parts of the battery cells are inserted, whereby the one-side sealing parts of the battery cells can be easily mounted to the side frame.

At the upper-end frame where the upper-end sealing parts of the battery cells are mounted, the upper electrode terminals of the battery cells are later connected to an external circuit. When a plurality of battery modules are stacked so as to constitute a medium- or large-sized battery module, electrode terminals of one battery module are connected to electrode terminals of another adjacent battery module. The electric connection may be directly performed at the upper electrode terminals without additional connecting members. Alternatively, the electric connection may be indirectly performed via the external input and output terminals of the upper-end frame.

When the electric connection is directly performed without additional connecting members, for example, the upper electrode terminals of the neighboring battery modules may be directly coupled to each other by welding.

The external input and output terminals may be integrally formed with the upper-end frame, for example, such that the external input and output terminals can be formed at predetermined positions when the frame member is molded. Alternatively, the external input and output terminals may be coupled to the upper-end frame as a separate member.

Since the lower electrode terminals of the battery cells are coupled to each other, the upper electrode terminals of the battery cells are mounted to the upper-end frame while upper electrode terminals of the battery cells are electrically isolated from each other. In a preferred embodiment, the upper-end frame is provided with grooves (insertion grooves), into which the upper-end sealing parts of the battery cells are inserted. Consequently, it is possible to bend the electrode terminals of the battery cells in opposite directions and then mount the bent electrode terminals of the battery cells to the upper-end frame while the upper-end sealing parts of the battery cells are inserted into the insertion grooves. In this case, the isolation of the two electrode terminals from each other is stably accomplished while the electrode terminals are mounted to the upper-end frame. Preferably, the upper electrode terminals are fully located in the upper-end frame so as to guarantee the isolation of the upper electrode terminals form the metal sheathing member.

The frame member according to the present invention is not particularly restricted so long as the frame member is made of an electrically insulating material. Preferably, the frame member is made of a plastic resin. More preferably, the upper-end frame, the lower-end frame, and the side frame are integrally formed.

According to the present invention, the metal sheathing member is a metal plate constituting the outer case of the battery module. Preferably, the metal sheathing member is made of a high-strength lightweight material, such as aluminum, whereby the battery cells are stably mounted in the metal sheathing member.

Preferably, the metal plate has a thickness of 0.2 to 1.0 mm. This is because, when the metal sheathing member is too thick, bending and cutting processes of the metal sheathing member are difficult, and when the metal sheathing member is too thin, the metal sheathing member cannot have a desired mechanical strength.

The metal plate is bent, for example, such that one-side surfaces of the battery cells are covered by the metal plate, and opposite ends of the metal plate are coupled to each other at the other-side surfaces of the battery cells. As a result, the outer surfaces of the battery cells and the outer surface of the side frame are completely covered by the metal plate.

The coupling between the opposite ends of the metal plate may be accomplished in various manners. For example, the coupling between the opposite ends of the metal plate may be accomplished by welding, soldering, bonding, integral molding using molten resin, and mechanical connection using hooks. It is preferable to accomplish the coupling between the opposite ends of the metal plate by welding because the coupling force between the opposite ends of the metal plate is high and the size of the coupling region is minimized when the welding is used.

According to the present invention, the caps serve to fix the electrode terminals of the battery cells, the frame member, and the metal sheathing member at the opposite ends of the battery cells. Specifically, the caps include a lower-end cap for fixing the lower electrode terminals of the battery cells, the lower-end frame, to which the lower electrode terminals are mounted, and the lower part of the metal sheathing member covering the outer surfaces of the lower electrode terminals and the lower-end frame, and an upper-end cap for fixing the upper electrode terminals of the battery cells, the upper-end frame, to which the upper electrode terminals are mounted, and the upper part of the metal sheathing member covering the outer surfaces of the upper electrode terminals and the upper-end frame.

Preferably, the lower-end cap may be provided with protrusions which cover the outer surfaces of the lower-end sealing parts of the battery cells such that the coupled lower electrode terminals of the battery cells more securely fixed by the protrusions.

In the case that the external input and output terminals are included in the upper-end frame, it is preferable that openings be formed in the upper-end cap such that the external input and output terminals are exposed to the outside through the openings.

The caps according to the present invention are not particularly restricted so long as the caps are made of an electrically insulating material. Preferably, the caps are made of a plastic resin.

In accordance with another aspect of the present invention, there is provided a medium- or large-sized battery module manufactured using the above-described battery module as a unit body. The combination of the battery module may be changed depending upon desired output and capacity, and therefore, the applicability of the battery module is very high.

The medium- or large-sized battery module according to the present invention is particularly preferable as a power source for devices, such as electric vehicles, hybrid electric vehicles, and electric motorcycles, which require high-output and large-capacity electric power and to which various external forces, for example, vibration and impact, are applied.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Hereinafter, the assembly process of a battery module according to a preferred embodiment of the present invention will be described with reference to FIG. 2, which is an exploded perspective view of the battery module.

Figure 2:
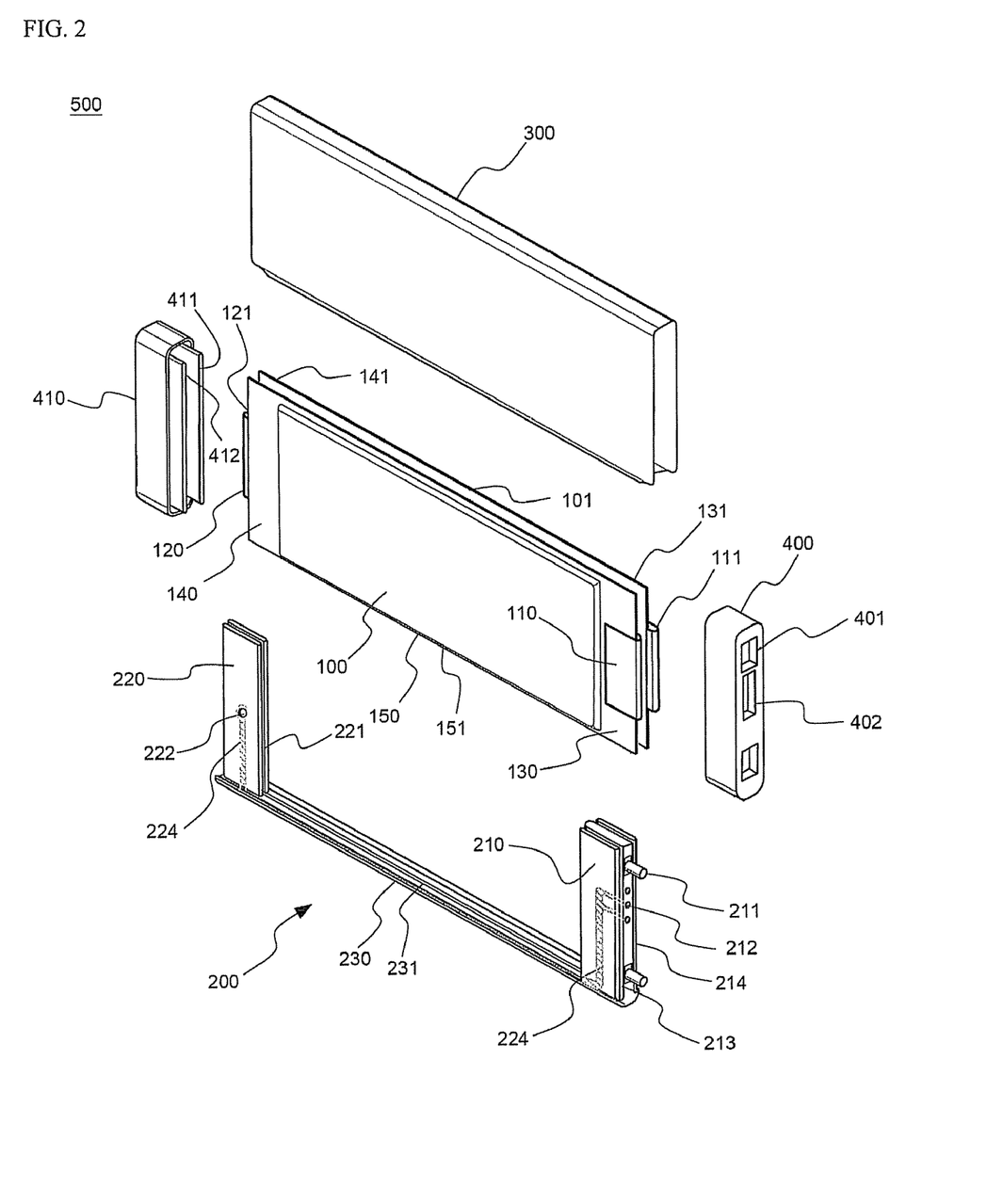
FIG. 2 is an exploded perspective view illustrating a battery module according to a preferred embodiment of the present invention.

Referring to FIG. 2, the battery module 500 includes a pair of battery cells 100 and 101, a frame member 200, a metal sheathing member 300, an upper-end cap 400, and a lower-end cap 410. The two battery cells 100 and 101 are mounted to the frame member 200 such that upper-end sealing parts 130 and 131, lower-end sealing parts 140 and 141, and right-side sealing parts 150 and 151 of the battery cells 100 and 101 are located at an upper-end frame 210, a lower-end frame 220, and a side frame 230 of the frame member 200. The metal sheathing member 300, which constitutes the outer case of the battery module 500, is mounted to cover the outer surfaces of the two battery cells 100 and 101 and the frame member 200. The upper-end cap 400 is mounted to fix the upper-end sealing parts 130 and 131, at which upper electrode terminals 110 and 111 of the two battery cells 100 and 101 are located, the upper-end frame 210, and the metal sheathing member 300. The lower-end cap 410 is mounted to fix the lower-end sealing parts 140 and 141, at which lower electrode terminals 120 and 121 of the two battery cells 100 and 101 are located, the lower-end frame 210, and the metal sheathing member 300. In this way, the battery module 500 is manufactured.

The two battery cells 100 and 101 are coupled to each other while the upper electrode terminals 110 and 111 of the two battery cells 100 and 101 are bent in opposite directions such that the upper electrode terminals 110 and 111 are located at the outsides of the upper-end sealing parts 130 and 131, and the lower electrode terminals 120 and 121 of the two battery cells 100 and 101 are bent toward each other such that the lower electrode terminals 110 and 111 are located at the insides of the lower-end sealing parts 140 and 141. For example, the lower electrode terminals 120 and 121 of the battery cells 100 and 101 may be coupled to each other by welding.

The frame member 200 includes the upper-end frame 210, the lower-end frame 220, and the side frame 230. One side of the upper-end frame 210 is connected to one side of the lower-end frame 220 via the side frame 230. In other words, the frame member 200 is constructed in a "⊏"-shaped structure in which one side of the frame member 200 is open.

At the upper-end surface of the upper-end frame 210 are formed external input and output terminals 211 and voltage and temperature detection connecting terminals 212. In the upper-end frame 210 are formed a pair of insertion grooves 213 and 214, into which the upper-end sealing parts 130 and 131 of the two battery cells 100 and 101 are inserted, such that the insertion grooves 213 and 214 are opened in one side of upper-end frame 210. In the lower-end frame 220 is formed a groove 221, into which the lower electrode terminals 120 and 121 of the two battery cells 100 and 101 are inserted, such that the groove 221 is opened in the same direction as the insertion grooves 213 and 214. In the lower-end frame 220 is formed a through-hole 222, which corresponds to the lower electrode terminals 120 and 121 of the two battery cells 100 and 101. The through-hole 222 is connected to a voltage and temperature detection terminal 225 (see FIG. 5). In the side frame 230 is mounted a wire 224 for connecting the voltage and temperature detection terminal 225 of the lower-end frame 220 to the connection terminal 212 of the upper-end frame 210. At the inner surface of the side frame 230 are formed grooves 231, which correspond to the side sealing parts 150 and 151 of the two battery cells 100 and 101.

The metal sheathing member 300 is bent to cover one-side surfaces of the two unit cells 100 and 101. The opposite ends of the metal sheathing member 300 are welded to each other at the other-side surfaces of the two unit cells 100 and 101, i.e., at the position where the side frame 230 is located, whereby the metal sheathing member 300 constitutes the outer case of the battery module 500.

In the upper-end cap 400 are formed openings 401 and 402, through which the external input and output terminals 211 and the voltage and temperature detection connecting terminals 212 of the frame member 200 are exposed to the outside. At the lower-end cap 410 are formed a pair of protrusions 411 and 412 for fixing the lower-end sealing parts 140 and 141 of the two unit cells 100 and 101 from the outsides thereof.

Figure 3:
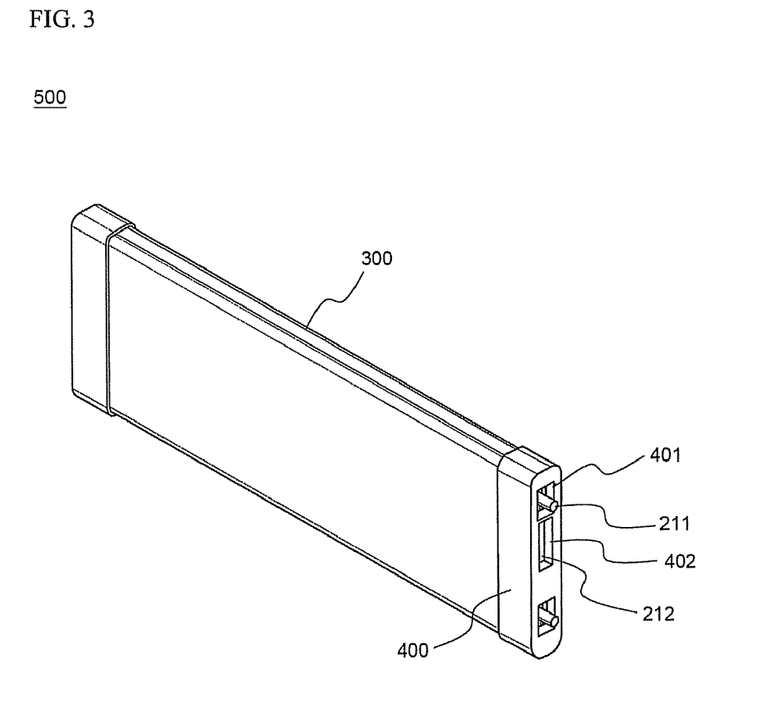
FIG. 3 is an assembled perspective view of the battery module shown in FIG. 2.

FIG. 3 is a perspective view of a battery module manufactured through the above-described process.

Referring to FIG. 3, the external input and output terminals 211 and the voltage and temperature detection connecting terminals 212 of the frame member (not shown) are exposed to the outside through the openings 401 and 402 of the upper-end cap 400. The two battery cells (not shown) are stably covered by the metal sheathing member 400. Consequently, the mechanical strength of a unit module 500 having the above-described construction is excellent although the unit module 500 is constructed in a slim structure.

Figure 4:
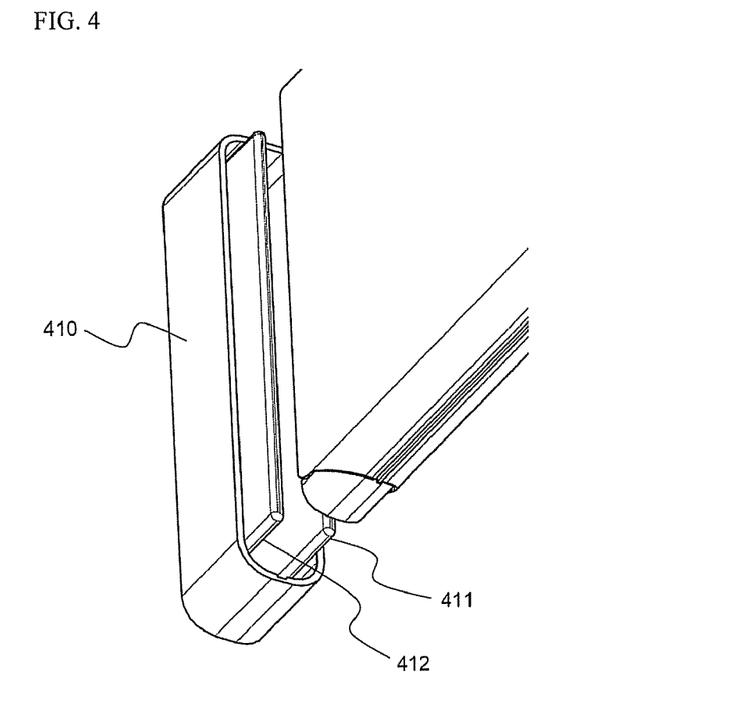
FIG. 4 is an enlarged perspective view illustrating a lower-end cap and the lower ends of battery cells of the battery module shown in FIG. 3.
Figure 5:
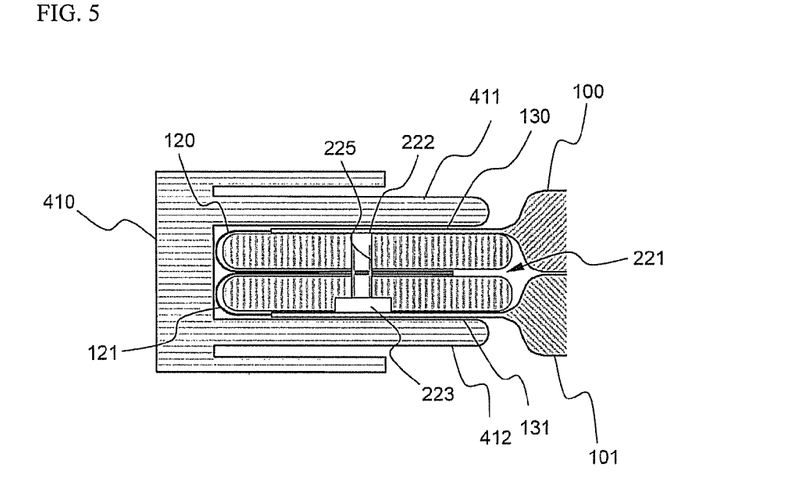
FIG. 5 is a sectional view illustrating the coupling between the lower-end cap and the lower ends of the battery cells of the battery module shown in FIG. 3.

FIG. 4 is an enlarged perspective view illustrating a lower-end cap and the lower ends of battery cells of the battery module shown in FIG. 3, and FIG. 5 is a sectional view illustrating the coupling between the lower-end cap and the lower ends of the battery cells of the battery module shown in FIG. 3.

Referring to these drawings, the lower electrode terminals 120 and 121 of the battery cells 100 and 101 are inserted into the groove 221 of the lower-end frame 220 while the lower electrode terminals 120 and 121 of the battery cells 100 and 101 are coupled with each other. The lower electrode terminals 120 and 121 are bent to cover the lower-end frame 220 such that the lower-end sealing parts 140 and 141 are located at the opposite sides of the groove 221. The lower electrode terminals 120 and 121 are connected to the voltage and temperature detection terminal 225, which is mounted to the inner surface of the through-hole 222 of the lower-end frame 220, by a fixing member 223 engaged in the through-hole 222. These coupling and connection regions are sealed by the lower-end cap 410, which covers the outsides of the lower-end sealing parts 140 and 141, and therefore, the coupling and connection regions are isolated from the outside. In addition, the coupling and connection regions are securely fixed by the protrusions 411 and 412 of the lower-end cap 410.

Figure 6:
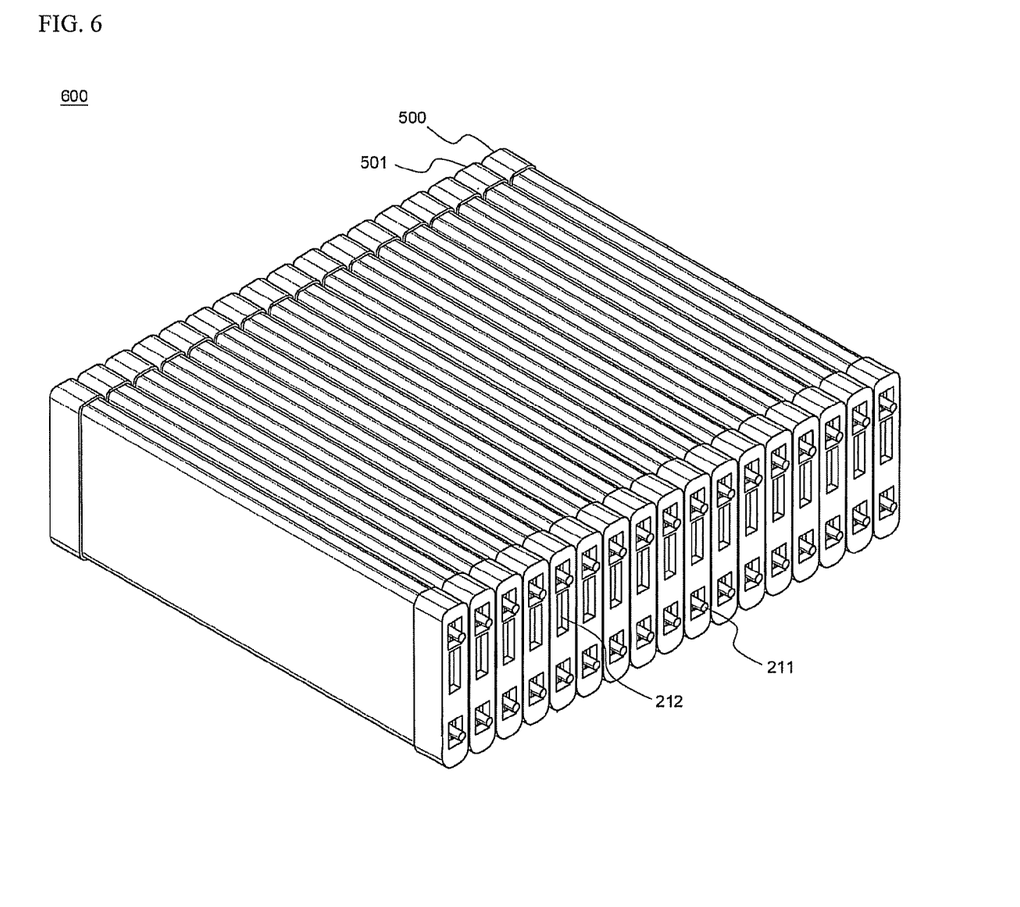
FIG. 6 is a perspective view illustrating a medium- or large-sized battery module manufactured using the battery module of FIG. 3 as a unit body.

FIG. 6 is a perspective view illustrating a medium- or large-sized battery module manufactured using the battery module of FIG. 3 as a unit body.

As shown in FIG. 6, the medium- or large-sized battery module 600 can be very easily manufactured by stacking unit modules 500, 501 . . . according to desired output and capacity. For example, the external input and output terminals 211 and the voltage and temperature detection connecting terminals 212 are connected to the corresponding ones by bus bars (not shown) while the battery modules 500, 501 . . . are successively attached to each other such that the sides of the battery modules 500, 501 . . . are adjacent to each other as shown in the drawing, whereby the battery module 600 is completed. The bus bars may be formed in various shapes, such as a wire, a flexible printed circuit board (PCB), and a metal plate.

The arrangement of the battery modules 500, 501 . . . to manufacture the medium- or large-sized battery module 600 may be accomplished in various forms. For example, as shown in FIG. 6, the battery modules 500, 501 . . . may be arranged in such a manner that the electrode terminals of the respective battery modules 500, 501 . . . are disposed at the same plane while the neighboring electrode terminals have opposite polarities. Alternatively, the battery modules 500, 501 . . . may be arranged in an alternating orientation structure in which the electrode terminals of the neighboring battery modules 500, 501 . . . are oriented by more than 90 degrees, for example, 180 degrees, with respect to each other. The alternating orientation structure is disclosed in Korean Patent Application No. 2004-0092887, which has been filed in the name of the applicant of the present patent application. The disclosure of the above-mentioned patent application is hereby incorporated by reference as if fully set forth herein.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the battery module according to the present invention is effective in that it is possible to minimize the weight and the size of the battery module while increasing the strength of the battery cells. Also, it is possible to easily mount the detecting means that detects the operation of the battery cells, and it is possible to effectively prevent the occurrence of short circuits during the assembly or the operation of the battery module. Furthermore, it is possible to easily perform the electric connection between the battery modules when manufacturing the medium- or large-sized battery module using the respective battery modules as unit bodies.

What is claimed is:

1. A battery module comprising:
   two battery cells, each of which has an upper electrode terminal and a lower electrode terminal formed at an upper end and a lower end thereof, respectively,
   each battery cell further comprising an upper-end sealing part, a lower-end sealing part, a first side sealing part and a second side sealing part;
   a frame member, to which the upper-end sealing part, the lower-end sealing parts, and one of the first and the second side sealing parts of each of the battery cells are mounted;
   a metal sheathing member which covers outer surfaces of the battery cells while the battery cells are mounted to the frame member; and
   an upper-end cap and a lower-end cap mounted to the upper end and the lower end of each of the battery cells, respectively,
   wherein the battery cells are covered by the metal sheathing member, and a first end of the metal sheathing member is interposed between an outer surface of the upper-end cap and the upper-end sealing part of each of the battery cells, and a second end of the metal sheathing member is interposed between an outer surface of the lower-end cap and the lower-end sealing part of each of the battery cells.

2. The battery module according to claim 1, wherein the frame member includes
   a lower-end frame having a groove, wherein the groove engages the lower electrode terminal of each of the battery cells and the lower electrode terminals of each of the battery cells are coupled with each other, and
   wherein the lower-end sealing part of each of the battery cells is mounted to the lower-end frame,
   an upper-end frame, wherein the upper-end sealing part of each of the battery cells is mounted to the upper-end frame, and
   a side frame connected between the lower-end frame and the upper-end frame, wherein the one of the first and the second-side sealing parts of each of the battery cells are mounted to the side frame.

3. The battery module according to claim 2, wherein the upper-end frame or the lower-end frame is provided with a detection terminal, which detects the voltage and/or the temperature of the battery cells, and
   the upper-end frame is provided with connection terminals which connect the detection terminal to an external circuit.

4. The battery module according to claim 3, wherein the detection terminal is mounted at the lower-end frame, and the detection terminal is connected to the connection terminals of the upper-end frame via a wire mounted in the side frame.

5. The battery module according to claim 4, wherein the lower-end frame has a through-hole, to which the detection terminal is connected.

6. The battery module according to claim 2, wherein the side frame comprises a plurality grooves which engage the one of the first and the second side sealing parts of each of the battery cells.

7. The battery module according to claim 2, wherein the upper-end frame comprises a plurality of insertion grooves which engage the upper electrode terminal of each battery cell and each upper electrode terminal is bent.

8. The battery module according to claim 2, wherein the upper-end frame has external input and output terminals, and the external input and output terminals and the upper-end frame are an indivisible unitary part or the external input and output terminals are coupled to the upper-end frame as a separate member.

9. The battery module according to claim 1, wherein the metal sheathing member is a metal plate having a thickness of 0.2 to 1.0 mm.

10. The battery module according to claim 9, wherein the metal plate includes a bend such that first side surfaces of the battery cells are covered by the metal plate, and opposite ends of the metal plate are welded to each other at a location corresponding to second side surfaces of the battery cells.

11. The battery module according to claim 1, wherein the lower-end cap further comprises a plurality of protrusions which cover outer surfaces of the lower-end sealing parts of the battery cells.

12. A battery pack comprising the battery module according to claim 1 as a unit body.

* * * * *